US005556716A

United States Patent [19]

Herron et al.

[11] Patent Number: 5,556,716

[45] Date of Patent: Sep. 17, 1996

[54] X-RAY PHOTOCONDUCTIVE COMPOSITIONS FOR X-RAY RADIOGRAPHY

[75] Inventors: Norman Herron, Newark; Ying Wang, Wilmington, both of Del.

[73] Assignee: E. I. Du Pont de Nemours and Company, Wilmington, Del.

[21] Appl. No.: 296,213

[22] Filed: Aug. 25, 1994

[51] Int. Cl.[6] .......... B32B 9/00

[52] U.S. Cl. .......... 428/688; 250/484.2; 378/28

[58] Field of Search .......... 428/690, 908.8, 428/483, 192; 250/483.1, 484.2, 214 VT; 430/534, 495; 378/28

[56] References Cited

U.S. PATENT DOCUMENTS

| | | | |
|---|---|---|---|
| 2,859,352 | 11/1958 | Sugarman, Jr. | 250/65 |
| 2,862,815 | 12/1958 | Sugarman, Jr. et al. | 96/1 |
| 3,772,028 | 11/1973 | Fico | 430/495 |
| 4,097,277 | 6/1978 | Takasu | 96/1.5 R |
| 4,204,118 | 5/1980 | Sheldon | 250/214 VT |
| 4,260,887 | 4/1981 | Dannert et al. | 250/315.2 |
| 4,738,798 | 4/1988 | Mahler | 252/518 |
| 5,025,163 | 6/1991 | Jeffers | 250/483.1 |
| 5,127,038 | 6/1992 | Jeromin et al. | 378/28 |
| 5,166,524 | 11/1992 | Lee et al. | 250/327.2 |
| 5,168,160 | 12/1992 | Jeromin et al. | 250/327.2 |
| 5,184,018 | 2/1993 | Conrads et al. | 250/370.09 |
| 5,238,607 | 8/1993 | Herron et al. | 252/518 |
| 5,273,910 | 12/1993 | Tran et al. | 437/3 |
| 5,291,036 | 3/1994 | Tran et al. | 257/53 |
| 5,340,661 | 8/1994 | Van Havenberg | 250/483.1 |

FOREIGN PATENT DOCUMENTS

| | | | |
|---|---|---|---|
| 1461340 | 12/1966 | France | G03C 5/08 |
| 2641067 | 3/1978 | Germany | G03G 15/00 |
| 798184 | 7/1958 | United Kingdom . | |
| 1064140 | 4/1967 | United Kingdom | H01C 7/08 |

OTHER PUBLICATIONS

Rowlands, J. A. et al, "X–Ray imaging using amorphous selenium: A photoinduced discharge readout method for digital mammography", *Med. Phys.*, 18, p. 421–431 (1991).

Hillen, W. et al in *Medical Imaging II*, R. H. Schneider et al (Ed.), "A selenium–based detector system for digital slot–radiography",'SPIE,'914, p. 253–261 (1988).

Zhao, W. et al, "Digital Radiography Using Self–Scanned Readout of Amorphous Selenium", *Proceedings of the Electrochemical Society Mtg.*, 92–2, p. 791, Toronto, Canada Oct. 11–16, 1992.

Burr, A. F., "Introduction to X–Ray Cross Sections", *CRC Handbook of Chemistry and Physics*, 74th ed., D. R. Lide (Ed.), CRC Press, Boca Raton, FL pp. 10–287–10–289 (1993–94).

Stolka, M. et al, "Trap–free charge transport in polymers, with tunable mobilities", *Synthetic Metals*, 54, 417–425 (1993).

Borsenberger, P. M. et al, "Effects of the Dipole Moment on Charge Transport in Disordered Molecular Solids", *J. Phys. Chem.*,'97, 4815–4819 (1993).

(List continued on next page.)

*Primary Examiner*—Patrick J. Ryan
*Assistant Examiner*—Patrick R. Jewik

[57] ABSTRACT

New x-ray photoconductive compositions are disclosed which are certain composites containing (1) inorganic clusters of VB-VIB semiconductors, VB-VIIB semiconductors, IIB-VIB semiconductos, IIB-VB semiconductors, IIIB-VB semiconductors, IIIB-VIB semiconductors, IB-VIB semiconductors and/or IVB-VIIB semiconductors and (2) polymers which are essentially non-carrier-transporting in the absence of x-rays. Also disclosed is an x-ray radiograpy apparatus which employs an image receptor which is a composite of certain inorganic clusters and polymers. A method is disclosed for enhancing the x-ray absorbing efficiency of a polymer which is essentially non-carrier transporting in the absence of x-rays and the x-ray photoconductivity of said polymer by doping the polymer with an effective amount of clusters having a size within the range of from about 0.001 μm to 10 μm.

17 Claims, 2 Drawing Sheets

OTHER PUBLICATIONS

Luhta, R. et al, "A Large Area X–Ray Sensitive Vidicon", *Proceedings of the Electrochemical Society Mtg.*, 92–2, p. 790, Toronto, Canada Oct. 11–16, 1992.

Greskovich, C. et al, "Ceramic Scintillators for Advanced Medical X–Ray Detectors", *Proceedings of the Electrochemical Society Mtg.*, 92–2, p. 793, Toronto, Canada Oct. 11–16, 1992.

Bueno, C., "New Luminescent Glasses and Fiber Optic Scintillators for use in X–ray Imaging", *Proceedings of the Electrochemical Society Mtg.*, 92–2, p. 794, Toronto, Canada Oct. 11–16, 1992.

Kuo, Y., "A Review of Thin Film Technologies in Preparing Thin Film Transistors for Liquid Crystal Displays", *Proceedings of the Electrochemical Society Mtg.*, 92–2, p. 786, Toronto, Canada Oct. 11–16, 1992.

Wang, Y. et al, "Nanometer–Sized Semiconductor Clusters: Materials Synthesis, Quantum Size Effects, and Photophysical Properties", *J. Phys. Chem.*, 95, 525–532 (1991).

Pai, D. M. et al, "Hole transport in solid solutions of substituted triarylmethanes in bisphenol–A–polycarbonate", *Phil. Mag. B*, 48(6), 505–522 (1983).

Calabrese, J. et al, "Preparation and Characterization of Layered Lead Halide Compounds", *J. Am. Chem. Soc.,'113, 2328–2330 (1991).*

Rowlands, J. A. et al, "Digital Radiology Using Amphorous Selenium", *Proceedings of the Electrochemical Society Mtg.*, 92–2, p. 788, Toronto, Canada Oct. 11–16, 1992.

Hunter, D. M. et al, "Digital Radiography: A Photoinduced Discharge Readout Method for Amphorous Selenium Plates", *Proceedings of the Electrochemical Society Mtg.*, 92–2, p. 789, Toronto, Canada Oct. 11–16, 1992.

X-RAY PHOTOCONDUCTIVE COMPOSITIONS FOR X-RAY RADIOGRAPHY

FIELD OF THE INVENTION

This invention relates to x-ray photoconductive compositions and use thereof in x-ray radiography.

BACKGROUND

Radiography has been used for over ninety years for capturing medical images (see L. K. Wagner et al. in "Imaging Processes and Materials" J Sturge et al (Ed.), Van Nostrand Reinhold, New York, 1989). In conventional radiography, the x-ray image is captured by a flat sheet of light-emitting phosphor material which is commonly called a screen. The screen emits light when stimulated by x-rays. The light emitted by the screen exposes a silver halide film that stores the image. Typically, the silver halide film is sandwiched between two phosphor screens.

In spite of the successful applications of the conventional film-screen system for radiography, there are many deficiencies (see L. K. Wagner et al. supra). For example, the exposure range of the film-screen system is limited and this sometimes results in over- or underexposure of the film. The exposure display latitude and the contrast of the display of the film-screen system are also limited. In addition, the required chemical processing of the film is inconvenient.

Digital radiography provides an alternative solution to the problems of conventional radiography. Digital image receptors are often capable of capturing a wide range of image information. The useful exposure display latitude is often superior to film, because the variable window level and contrast display of digital images eliminate the display limitations of the film. The ability to improve image by software manipulation gives further flexibility to the digital techniques. However, digital radiography often compromise on spatial resolution.

One form of digital radiography uses a photo-stimulable phosphor (PSP). The PSP is exposed to x-rays to produce a latent image in the form of a varying density distribution of trapped electrons. The plate is then scanned by a laser of relatively long wavelength, usually in the red region of the visible spectrum. The electrons are driven out of their trapped levels by the laser and return to the ground state by emitting a high energy photons (typically green). The high energy photons are then detected imagewise by a photodetector. The main disadvantage of the PSP technology is the slow speed limited by scanning a laser from pixel to pixel. The spatial resolution is also limited by light scattering from the phosphor screen which consists of phosphor powders.

Another form of digital radiography uses x-ray sensitive photoconductors. X-ray photoconductor is deposited as a thin film on a conducting substrate such as aluminum or indium tin oxide glass (ITO). The film is first charged positively or negatively. Exposure to x-ray photons discharges the film imagewise. The residual charges on the film can then be read out imagewise by a detector. Several read-out methods have been developed for this purpose. The photo-induced discharge method uses a scanning laser to discharge the voltage imagewise, and the discharge is detected by an electrometer (see J. A. Rowlands et al., Med. Phys., 18, 421 (1991)). Another method uses a scanning electrometer array to directly measure the voltage imagewise (see W. Hillen et al. in Medical Imaging II, R. H. Schneider et al. (Ed.), SPIE 914, 253 (1988)). The residual voltage can also be read out directly imagewise by a large-area thin-film transistor array (see W. Zhao et al., Proceedings of the Electrochemical Society Meeting, Vol. 92-2, p. 791, Toronto, Canada, Oct. 11-16, 1992).

The principle of x-ray photoconductivity is based on the ability of high energy x-ray radiation to ionize matter. When an atom absorbs an x-ray photon, it is ionized and ejects high-energy electrons. The high-energy electrons travel through the material and cause more ionization until they are thermalized. The overall result of the absorption of x-ray photons by matter is the formation of tracks of ionized species. The distribution of ionized species can be very inhomogeneous, often concentrated in regions called spurs, blobs, or tracks. The exact distribution depends on the energy of the radiation and the material. (A detailed discussion can be found in J. W. T. Spinks et al., "An Introduction to Radiation Chemistry" Wiley, New York, 1976.)

X-ray photoconductors can be used as imaging elements in radiography. The x-ray photoconductive film is first charged and then exposed to x-ray radiation imagewise. X-ray photons generate ionized species (charges) as described above. If the material is capable of transporting charges, the absorption of x-ray causes discharge imagewise. The residual surface charges can then be read imagewise by various techniques such as laser scanning, electrometer array, and thin film transistor array.

A useful x-ray photoconductive material therefore has to have the following properties. First, it has to be a good insulator in the dark (i.e., low dark conductivity), capable of forming large area thin film and sustaining high electric field. Most of the inorganics have problems fulfilling these requirements. Good x-ray absorbing inorganics such as $HgI_2$ and $BiI_3$ usually have small band-gaps which means high dark conductivity due to thermal excitation of carriers. Large area thin-films of good x-ray absorbing inorganics are difficult to fabricate and they usually cannot sustain large electric field due to high dark conductivity and the presence of defects. On the other hand, organic polymers excel in this area. They have superior dielectric strength and can be fabricated into large area thin-films by well-established methods such as spin-coating or thermal pressing.

The next important requirement for a good x-ray photoconductor is large x-ray absorption cross section. This is a requirement which organics fail totally but inorganics excel. No organic polymer has an x-ray absorption efficiency good enough for practical applications. On the other hand, the x-ray absorption efficiency of inorganics can be very large, and increases approximately with increasing atomic number. The x-ray absorption cross sections of various elements at different x-ray energies have been tabulated (see CRC Handbook of Chemistry and Physics, 74th edition, D. R. Lide, ed., CRC Press, Boca Raton, Fla., 1993-94, pp. 10-287-10-289).

Finally, a good photoconductor requires that the generated carriers move through the film without significant trapping. This property is unpredictable for either organics or inorganics and depends on the material, the preparation procedures, the presence of impurities, defects.

In sum, a useful x-ray photoconductive film should be a good insulator in the dark and capable of sustaining high electric field, should have high x-ray absorption cross section, and should permit generated carriers to move through the film without being significantly trapped. In addition, if photo-induced discharge is employed as the read-out method, the material should be a good uv-vis-IR photoconductor.

Good x-ray photoconductors are difficult to prepare. Inorganics containing heavy elements absorb x-ray photons efficiently, but are difficult to fabricate into large area, good quality thin-films. Furthermore, they usually have high dark conductivity and cannot sustain high electric fields. Polymers can be fabricated into good quality thin-films, have low dark conductivity and high dielectric strength, but are inefficient x-ray absorbers.

At present selenium is the only useful x-ray photoconductive material that can meet these stringent requirements. It also has many drawbacks. The x-ray absorption efficiency of selenium is not very high. Good quality selenium thin-films without carrier trapping sites are notoriously difficult to prepare. The toxicity of selenium and issues regarding its safe handling are of great concern. There is continuing interest in developing other useful materials having x-ray photoconductivity.

U.S. Pat. No. 4,738,798, discloses compositions of semiconductor clusters doped into ethylenemethacrylic acid copolymer. U.S. Pat. No. 5,238,607, disclosed photoconductive polymer compositions containing semiconductor nanoclusters selected from the group consisting of IIB-VIB, IIB-VB, IIIB-VB, IIIB-VIB, IB-VIB, and IVB-VIIB semiconductors.

SUMMARY OF INVENTION

This invention provides new x-ray photoconductive compositions which are composites containing inorganic clusters and polymers, and an x-ray radiography apparatus employing an image receptor which is a composite of inorganic clusters and polymers. More particularly, an x-ray radiography apparatus having an x-ray source and an x-ray sensitive image receptor is provided which is characterized by said image receptor including an x-ray photoconductor composition comprising (1) clusters of at least one semiconductor selected from the group consisting of VB-VIB semiconductors, VB-VIIB semiconductors, IIB-VIB semiconductors, IIB-VB semiconductors, IIIB-VB semiconductors, IIIB-VIB semiconductors, IB-VIB semiconductors and IVB-VIIB semiconductors, and (2) an organic binder which comprises a polymer component which is essentially non-carrier-transporting in the absence of x-rays and optionally a carrier transporting additive component. The cluster component (1) is at least about 0.1 percent by weight of the x-ray photoconductor composition and said organic binder is present in an effective amount to bind the clusters, provided that when the organic binder is essentially non-carrier transporting in the presence of x-rays, the cluster component (1) is at least about 15 percent by volume of the x-ray photoconductor composition. X-ray photoconductor compositions of this invention include embodiments where said clusters are clusters of at least one semiconductor selected from the group consisting of VB-VIB semiconductors and VB-VIIB semiconductors and embodiments where said clusters are at least about 55 percent by weight of the x-ray photoconductor composition.

A method is also provided for enhancing the x-ray absorbing efficiency of a polymer which is essentially non-carrier transporting in the absence of x-rays and the x-ray photoconductivity of said polymer. The method is characterized by doping the polymer with an effective amount of clusters of at least one semiconductor selected from the group consisting of VB-VIB semiconductors, VB-VIIB semiconductors, IIB-VIB semiconductors, IIB-VB semiconductors, IIIB-VB semiconductors, IIIB-VIB semiconductors, IB-VIB semiconductors and IVB-VIIB semiconductors, said clusters having a size within the range of from about 0.001 μm to 10 μm.

DETAILED DESCRIPTION

Figure 3:
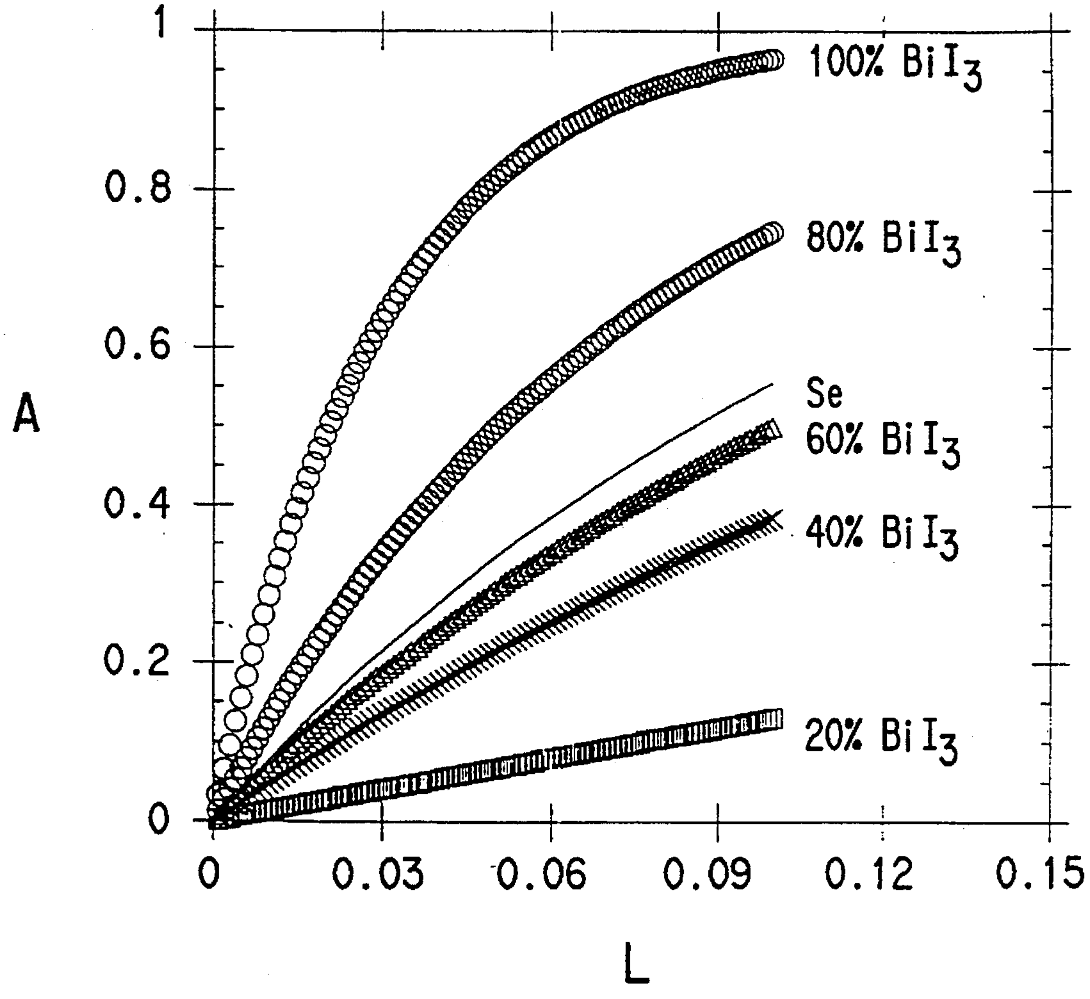
FIG. 3 shows calculated relative x-ray absorbing efficiencies, A, of $BiI_3$-doped polymer at different weight percents and of selenium as a function of film thickness, L (in centimeters).

The composites provided by this invention combine the advantages of both inorganics and organics. The inorganic clusters possess large x-ray absorption efficiency and the polymer matrix provides good dielectric properties and ease of thin-film preparation. In such a composition, large amounts of inorganics have to be dispersed into the polymer to maintain high x-ray absorption efficiency, because of the dilution effect introduced by the low x-ray absorbing polymers. An example is given for $BiI_3$ in N-polyvinylcarbazole (PVK). As shown in FIG. 3, for tungsten radiation at 62 KeV, about 60 wt % of $BiI_3$ needs to be dispersed into PVK so that the composite can have an x-ray absorption efficiency comparable to that of selenium films of equivalent thickness.

In accordance with this invention clusters of at least one inorganic semiconductor are dispersed throughout at least one polymer which is essentially non-carrier-transporting in the absence of x-rays. The resulting compositions, while incorporating polymer processability, have advantageous x-ray photoconductivity properties (e.g., x-ray-induced discharge) when compared to the polymer alone.

The inorganic semiconductors useful in the practice of this invention are selected from at least one of VB-VIB, VB-VIIB, IIB-VIB, IIB-VB, IIIB-VB, IIIB-VIB, IB-VIB, and IVB-VIIB semiconductors. A VB-VIB semiconductor is a compound which contains at least one element from Group VB of the periodic table and at least one element from Group VIB of the periodic table; a group VB-VIIB semiconductor, at least one element from Group VB of the periodic table and at least one element from Group VIIB of the periodic table; and, respectively, for the other useful semiconductors listed.

Preferred VB-VIB semiconductors are $Bi_2S_3$ and $Bi_2Se_3$; preferred VB-VIIB semiconductors are $BiI_3$ and $BiBr_3$; preferred IIB-VIB semiconductors are CdS, CdSe, CdTe, and HgS; preferred IIB-VB, $Cd_2P_3$; preferred IIIB-VB, InAs and InP; preferred IIIB-VIB, $In_2S_3$ and $In_2Se_3$; preferred IB-VIB, $Ag_2S$; and preferred IVB-VIIB, $PbI_2$, $PbI_4^{-2}$ and $Pb_2I_7^{-3}$ The clusters of at least one inorganic semiconductor are preferably at least about 55% by weight, based on the total weight of the composition and, more preferably, at least 60% by weight, based on the total weight of the photoconductive composition. Each cluster can range in size from about $1\times10^{-3}$ μm to 10 μm, preferably from $1\times10^{-3}$ μm to 1 μm, and more preferably from $1\times10^{-3}$ μm (10 Angstroms) to 0.1 μm (1000 Angstroms).

The clusters of semiconductor useful in the practice of this invention can be prepared in accordance with the disclosure of Y. Wang et al., J. Phys. Chem., 1991, 95, 525–532, which disclosure also details the properties and structure thereof. These clusters possess structures that are substantially the same as bulk semiconductors, yet can have properties which are dramatically different from the bulk semiconductors. The electronic properties of the clusters depend primarily on the cluster size, a phenomenon commonly referred to as the quantum size or quantum confinement effect. The effect is manifested as a blue-shift in the energy of the exciton, i.e., an electron-hole pair bounded by Coulomb interaction and enhancement in the volume-normalized oscillator strength as the cluster size becomes comparable to or below that of the exciton size.

By selecting semiconductor materials as indicated herein, this invention solves the problem of inefficient x-ray absorption by polymers by combining the polymers with strongly x-ray absorbing inorganic nanoclusters. For this approach to be successful, three criteria have to be met. (1) The inorganics have to be small enough to enable the escape of electrons, generated by x-ray photons, into the surrounding matrix. (2) Either the polymer matrix or the inorganic nanoclusters themselves have to be able to transport the carriers. Where the nanoclusters provide the transport, the nanoclusters should be present in high enough concentrations (usually at least about 15% by volume) to form a percolating network for conduction to occur. (3) Because of the dilution effect of polymer, the volume fraction of the inorganic has to be high enough so that the total x-ray absorption remains high.

The polymers used in the practice of this invention are essentially non-carrier transporting in the absence of x-rays, and include polymers which are carrier-transporting in the presence of x-rays and polymers which are non-carrier-transporting in the presence of x-rays. Examples of carrier-transporting polymers in the presence of x-rays include N-polyvinylcarbazole, polysilanes, polyanilines, polythiophenes, polyacetylenes, and poly (p-phenylenevinylene). Examples of non-carrier-transporting polymers in the presence of x-rays include polymethylmethacrylate, nylons, polycarbonate, polyethylene, polystyrene and copolymers of styrene (e. g., styrene/butylacrylate copolymers ).

Carrier-transporting additives may be used to enhance the carrier transport properties of polymers, particularly polymers which are essentially non-carrier transporting or have very low carrier transport properties. Examples of carrier-transporting additives include 1, 1-bis [(di-4-tolylamino) phenyl]cyclohexane (TAPC), N, N'-diphenyl-N,N'-bis (3-methylphenyl)- [1, 1'-biphenyl]4,4'-diamine (TPD), p-(diethylamino)benzaldehyde diphenylhydrazone (DEH), N,N,N',N'-tetrakis (4-methylphenyl) (1, 1'-biphenyl)-4,4'-diamine (TTB), Bis [4-(N,N-diethylamino)-2-methylphenyl ](4-methylphenyl) methane (MPMP), 5'- [4- [bis (4-ethylphenyl) amino]phenyl]-N,N, N'N'-tetrakis (4-ethylphenyl) 1, 1':3', 1'-terphenyl-4,4'-diamine (p-pEFTP), N,N'-bis (4-methylphenyl)-N,N'-bis (4-ethylphenyl)- [1, 1'-(3, 3'-dimethyl)biphenyl]-4,4'-diamine (ETPD), and 1-phenyl-3- [p- (diethylamino) styryl]-5- [p- (diethylamino)phenyl] pyrazoline (DEASP). More can be found in P. M. Borsenberger et al., supra, J. Phys. Chem., 97, 815 (1993); M. Stolka et al., Syn. Met., 54, 417 (1993); and D. M. Pal et al., Phil. Mag. BB. 48, 505 (1983). Electron or hole-transporting molecules can be advantageously added to a polymer where the polymer matrix cannot transport carriers. For example, although polystyrene is an insulator, the addition of amines such as 1,1-bis[(di-4-tolylamino) phenyl]cyclohexane (TAPC) can make it into a good hole-transporting material (see P. M. Borsenberger et al., supra).

Good quality thin films (e.g., 1 to 1000 μm) of the photoconductive compositions of the invention can conveniently be prepared by spin-coating of a solution of the clusters and the polymer, thermally pressing the clusters and polymer together or, alternatively, the clusters can be directly synthesized inside the polymer film.

Compositions of this invention may be used for applications in x-ray imaging processes and x-ray radiography apparatus which have heretofor employed bulk selenium semiconductors. In these applications the x-ray photoconductive compositions of this invention cause conductivity to increase in the exposed area to dissipate surface charge partially or wholly in the x-ray exposed area and to leave a substantially unaffected charge in the unexposed area. The resulting electrostatic latent image can be read out imagewise using known methods developed for use with selenium semiconductors.

X-ray radiography apparatus typically includes an x-ray source and an image receptor. Conventional x-ray sources typically use Cu, Mo and W as the target material. Conventional image receptors typically comprise a silver halide film and phosphor screen combination or a selenium film. The present invention provides new image receptors which comprise cluster-polymer combinations.

Where the photoconductive element is in the form of a self-supporting film or a coating, one side of the photoconductive element preferably contacts an electrically conductive surface during charging of that element. Where the photoconductive element is a self-supporting film, the film may be metallized on one side by, for example, aluminum, silver, copper, nickel, and the like to provide an electrically conductive layer for contacting an electrically conductive surface during charging. Alternatively, an electrically conductive surface may be provided by laminating the metallized films to provide a metal foil. As a further alternative, the photoconductive element can be brought into direct electrical contact with a conducting surface to effect charging. Good contact between the film and the conducting surface can be insured by wetting the conducting layer with water or a suitable organic liquid, such as ethanol, acetone or a conductive fluid.

The electrically conductive surface employed to charge the photoconductive element can be in the form of a plate, sheet or layer having a specific resistivity smaller than that of the photoconductive element generally less than $10^9$ ohm-cm, preferably $10^5$ ohm-cm or less. Accordingly, suitable electrically conductive surfaces include metal sheets, or insulators such as glass, polymer films, or paper which are coated with conductive coatings or wetted with conductive liquids or otherwise are made conductive.

The surface of the photoconductive elements that employ the x-ray photoconductive compositions in accordance with this invention can be charged for image retention by well known techniques such as corona charging, contact charging, capacitive charging, and the like. Charging preferably is performed in darkness or in subdued illumination. Either negative or positive potential can be applied. During charging, the electrically conductive surface of the x-ray photoconductive element should be grounded.

In performing x-ray-imaging, the x-ray photoconductive compositions of this invention can be carried on a support or fabricated into a self-supporting photoconductive layer, grounded, and given a surface electrostatic charge. The charged surface can be given a conventional exposure to actinic radiation to produce an electrostatic latent image.

When the photoconductive elements comprising the photoconductive compositions of this invention are exposed to x-ray radiation, the exposed areas are discharged to leave the unexposed areas more highly charged. The resulting electrostatic image can be converted to a visible image according to standard electrophotographic development techniques. Suitable developers or toners include charged aerosols, powders, or liquids containing finely divided, charged substances which are attracted to the charged image areas. Alternatively, the images can be read digitally using laser scanning photo-induced discharge, an electrometer array or a thin film transistor array.

The x-ray photoconductive compositions in accordance with this invention can be fabricated into a variety of x-ray photoconductive elements depending on the requirements of the x-ray-imaging application. The x-ray photoconductive elements that comprise the x-ray photoconductive compositions of the invention can be employed in the form of, for example, self-supporting films, or as coatings on support materials. Coatings can be formed on a support material by conventional methods, for example, spraying, spin-coating, draw-coating, melt-pressing and the like.

In addition the x-ray photoconductive compositions in accordance with this invention can be useful in various processes for electrostatic or xerographic image reproduction. Further, the x-ray photoconductive compositions of the invention can be employed as photodetectors or components of electroluminescent devices.

The nature of the polymer matrix is important. It has to have good film-forming properties, mechanical strength, and the ability to mix with large amount of inorganics. The polymer can perform either an active or a passive role. In cases when the inorganics are not interconnecting or when the inorganics are not capable of transporting carriers, then the polymer matrix must perform the function of charge transport. It then has to be redox stable and possess low density of carrier traps. Example of carrier-transporting polymers are N-polyvinylcarbazole, polysilanes, polyanilines, polythiophenes, polyacetylenes, and poly(p-phenylenevinylene).

If the inorganics are interconnecting (such as when the concentration is above the percolation threshold of about 15% by volume) and capable of transporting charges, then the polymers function mainly as binders. Examples of non carrier-transporting polymers are polymethylmethacrylate, nylons, polycarbonate, polyethylene, polystyrene and copolymers of styrene (e.g., styrene/butylacrylate copolymers).

Practice of the invention will be further apparent from the following non-limiting Examples.

EXAMPLES

X-ray photo-induced discharge analysis

Figure 1A:
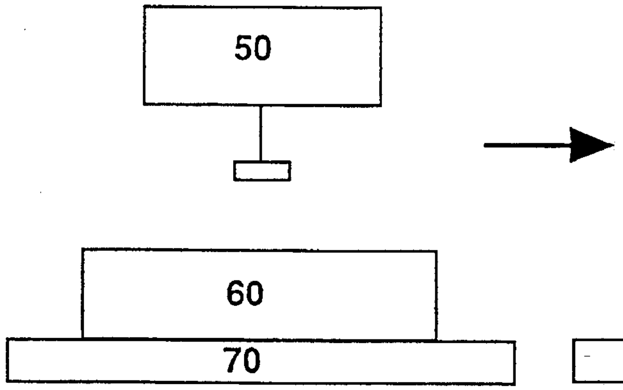
FIG. 1 is a schematic view of an apparatus for measurement of the x-ray-induced discharge of the x-ray photoconductive compositions of the invention including charging (FIG. 1 (*a*)) and charge detection (FIG. 1 (*b*)) stages.
Figure 1B:
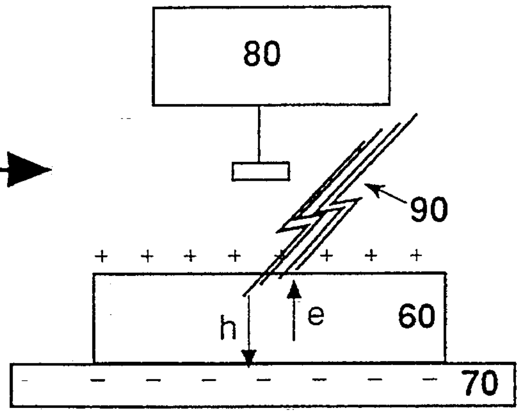

The x-ray photoconductivity of a film of x-ray photoconductive composition according to the invention is measured by x-ray photo-induced discharge as shown schematically in FIG. 1. Generally, x-ray photoconductive film (60) is cast onto a metal (typically aluminum or indium tin oxide) electrode (70) by known methods such as evaporation, spin-coating, or thermal pressing. The film typically has a thickness of from 0.1 to 1000 microns. The surface of the film (60) is charged by a corona charger (50). The presence of charge on film (60), as is known in the art, can be detected by electrostatic voltmeter (80). Upon exposure to x-rays (90) to induce discharge of film (60), electrons (e) and holes (h) are generated in the film (60) which migrate to the surface of film (60) to discharge. The rate and the completeness of the x-ray induced discharge gauge the x-ray photoconductive properties of the film (60).

Figure 2:
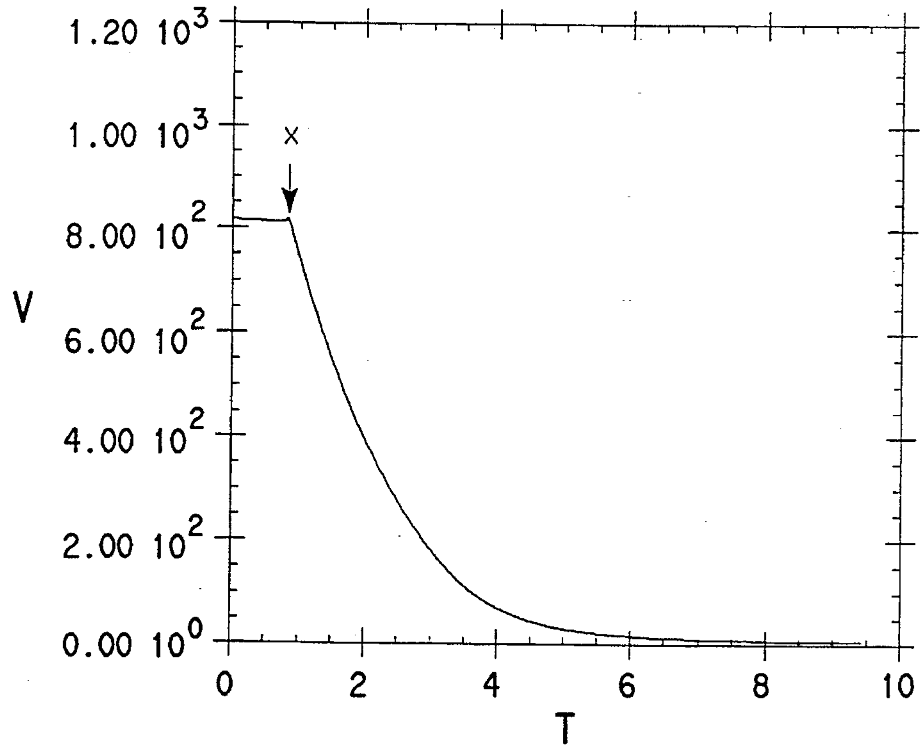
FIG. 2 is a typical trace of voltage, V (in volts) versus time, T (in seconds) from x-ray induced discharge of the x-ray photoconductive compositions of the invention (point x represents onset of x-rays). This particular composition is described in Example 16.

A typical trace of the x-ray-induced discharge experiment is shown in FIG. 2, with onset of x-ray induced discharging clearly marked.

EXAMPLE 1

$(CH_3NH_3)_2PbI_4$ (about 10 weight %) in PVK 0.1 g powdered $(CH_3NH_3)_2PbI_4$ is dissolved in 10 mL DMF containing 0.9 g dissolved PVK (polyvinylcarbazole) under nitrogen in an inert atmosphere glove-box to give a thick clear yellow solution. The solution is coated onto a conductive substrate such as A1 or ITO under nitrogen and allowed to dry to a thin-film of deep red-black material and gently warmed (60° C.) to remove residual DMF solvent. The results of x-ray induced discharge assessment of the film are shown in Table I.

EXAMPLE 2

$BiI_3$ (about 20 weight %) in PVK 0.05 g powdered $BiI_3$ is dissolved in 2 mL pyridine containing 0.2 g dissolved PVK (polyvinylcarbazole) under nitrogen in an inert atmosphere glove-box to give a thick clear orange solution. The solution is coated onto a conductive substrate such as Al or ITO under nitrogen and allowed to dry to a thin-film of deep red-black material and gently warmed to 150° C. under vacuum for 30 mins to remove residual pyridine solvent. The results of x-ray induced discharge assessment of the film are shown in Table I.

EXAMPLE 3

$BiI_3$ (about 10 weight %) in phenylmethylpolysilane (PMPS)

0.01 g powdered $BiI_3$ is dissolved in 1 mL pyridine containing 0.09 g dissolved PMPS under nitrogen in an inert atmosphere glove-box to give a thick clear orange solution. The solution is coated onto a conductive substrate such as A1 or ITO under nitrogen and allowed to dry to a thin-film of deep red-black material and gently warmed to 60° C. to remove residual pyridine solvent. The results of x-ray induced discharge assessment of the film are shown in Table I.

EXAMPLE 4

$PbI_2$ (about 50 weight %) in PVK 1.0 g powdered $PbI_2$ is dissolved in 15 mL pyridine containing 1.0 g dissolved PVK (polyvinylcarbazole) under nitrogen in an inert atmosphere glove-box to give an opaque creamy slurry. The solution is coated onto a conductive substrate such as Al or ITO under nitrogen and allowed to dry to a thin-film of pale yellow material and gently warmed to 50° C. under 500 torr nitrogen for 60 mins to remove residual pyridine solvent. The results of x-ray induced discharge assessment of the film are shown in Table I.

EXAMPLE 5

$BiI_3$ (about 20 weight %) with butylated-hydroxytoluene) (BHT about 2 weight %) in PVK 0.25 g powdered $BiI_3$ is dissolved in 10 mL pyridine containing 1.0 g dissolved PVK (polyvinylcarbazole) under nitrogen in an inert atmosphere glove-box to give a thick clear orange solution. 0.1 g of the antioxidant BHT is added and dissolved. The solution is coated onto a conductive substrate such as Al or ITO under nitrogen and allowed to dry to a thin-film of deep red-black material. The films are then gently warmed to 125° C. under 250 torr hydrogen for 30 mins to remove residual pyridine solvent and to reduce any oxidized impurities in the films. The results of x-ray induced discharge assessment of the film are shown in Table I.

EXAMPLE 6

$Bi_2S_3$ (about 20 weight %) in PVK 0.485 g powdered $Bi(NO_3)_3$ is dissolved in 10 mL DMF containing 1.0 g dissolved PVK (polyvinylcarbazole) under nitrogen in an inert atmosphere glove-box to give a thick opaque white solution. The solution is coated onto a conductive substrate such as Al or ITO under nitrogen and allowed to dry to a thin-film of white material. The films are then gently warmed to 150° C. under 300 torr hydrogen sulfide gas for 5 mins to convert the nitrate salt to bismuth sulfide—the film turns black as this procedure is carried out. The results of x-ray induced discharge assessment of the film are shown in Table I.

EXAMPLE 7

$Bi_2Se_3$ (about 20 weight %) in PVK 0.485 g powdered $Bi(NO_3)_3$ is dissolved in 10 mL DMF containing 1.0 g dissolved PVK (polyvinylcarbazole) under nitrogen in an inert atmosphere glove-box to give a thick opaque white solution. The solution is coated onto a conductive substrate such as Al or ITO under nitrogen and allowed to dry to a thin-film of white material. The films are then gently warmed to 150° C. under 200 torr hydrogen selenide gas for 5 mins to convert the nitrate salt to bismuth selenide—the film turns black as this procedure is carried out. The results of x-ray induced discharge assessment of the film are shown in Table I.

EXAMPLE 8

$BiI_3$ (about 50 weight %) in polycarbonate 0.25 g powdered $BiI_3$ is dissolved in 2.5 mL THF containing 0.25 g dissolved polycarbonate under nitrogen in an inert atmosphere glove-box to give a thick clear orange solution. The solution is coated onto a conductive substrate such as Al or ITO under nitrogen and allowed to dry to a thin film of deep red-orange to black material and gently warmed (60° C.) to remove residual THF solvent. The results of x-ray induced discharge assessment of the film are shown in Table I.

EXAMPLE 9

$BiI_3$ (about 50 weight %) in polycarbonate 0.25 g powdered $BiI_3$ is dissolved in 2.5 mL cyclopentanone containing 0.25 g dissolved PVK under nitrogen in an inert atmosphere glove-box to give a thick clear orange solution. The solution is coated onto a conductive substrate such as Al or ITO under nitrogen and allowed to dry to a thin film of deep red-orange to black material and gently warmed (60° C.) to remove residual cyclopentanone solvent. The results of x-ray induced discharge assessment of the film are shown in Table I.

EXAMPLE 10

$BiI_3$ (about 50 weight %) in polystyrene 0.25 g powdered $BiI_3$ is dissolved in 2 mL THF containing 0.25 g dissolved polystyrene under nitrogen in an inert atmosphere glove-box to give a thick clear orange solution. The solution is coated onto a conductive substrate such as Al or ITO under nitrogen and allowed to dry to a thin-film of deep red-orange to black material and gently warmed (60° C.) to remove residual THF solvent. The results of x-ray induced discharge assessment of the film are shown in Table I.

EXAMPLE 11

$BiI_3$ (about 75 weight %) in polystyrene 0.75 g powdered $BiI_3$ is dissolved in 4 mL THF containing 0.25 g dissolved polystyrene under nitrogen in an inert atmosphere glove-box to give a thick clear orange solution. The solution is coated onto a conductive substrate such as Al or ITO under nitrogen and allowed to dry to a thin-film of deep red-orange to black material and gently warmed (60° C.) to remove residual THF solvent. The results of x-ray induced discharge assessment of the film are shown in Table I.

EXAMPLE 12

$BiI_3$ (about 50 weight %) in polystyrene doped with 20 weight % TPD 0.25 g powdered $BiI_3$ is dissolved in 3 mL THF containing 0.15 g dissolved polystyrene and 0.1 g TPD under nitrogen in an inert atmosphere glove-box to give a thick clear orange solution. The solution is coated onto a conductive substrate such as Al or ITO under nitrogen and allowed to dry to a thin-film of deep red-orange to black material and gently warmed (60° C.) to remove residual THF solvent. The results of x-ray induced discharge assessment of the film are shown in Table I.

EXAMPLE 13

$BiI_3$ (about 67 weight %) in PMPS 0.2 g powdered $BiI_3$ is dissolved in 1 mL THF containing 0.1 g dissolved PMPS under nitrogen in an inert atmosphere glove-box to give a thick clear orange solution. The solution is coated onto a conductive substrate such as Al or ITO under nitrogen and allowed to dry to a thin-film of deep red-orange to black material and gently warmed (60° C.) to remove residual THF solvent. The results of x-ray induced discharge assessment of the film are shown in Table I.

EXAMPLE 14

$BiI_3$ (about 50 weight %) in polycyclohexylmethylsilane-PCHMS 0.25 g powdered $BiI_3$ is dissolved in 2 mL THF containing 0.25 g dissolved PCHMS under nitrogen in an inert atmosphere glove-box to give a thick clear orange solution. The solution is coated onto a conductive substrate such as A1 or ITO under nitrogen and allowed to dry to a thin-film of deep red-orange to black material and gently warmed (60° C.) to remove residual THF solvent. The results of x-ray induced discharge assessment of the film are shown in Table I.

EXAMPLE 15

$BiI_3$ (about 67 weight %) in Polymethylmethacrylate (PMMA)

0.2 g powdered $BiI_3$ is dissolved in 1 mL THF containing 0.1 g dissolved PMMA under nitrogen in an inert atmosphere glove-box to give a thick clear orange solution. The solution is coated onto a conductive substrate such as A1 or ITO under nitrogen and allowed to dry to a thin-film of deep red-orange to black material and gently warmed (60° C.) to remove residual THF solvent. The results of x-ray induced discharge assessment of the film are shown in Table I.

EXAMPLE 16

$BiI_3$ (about 50 weight %) in nylon-11

1.0 g powdered $BiI_3$ is dissolved in a melt of 1.0 g nylon-11 at 190° C. under nitrogen in an inert atmosphere glove-box to give a thick clear orange solution. The viscous melt is pressed onto a conductive substrate such as A1 or ITO under nitrogen and allowed to cool to a thin-film of deep red-orange to black material. The results of x-ray induced discharge assessment of the film are shown in Table I.

EXAMPLE 17

$BiI_3$ (about 50 weight %) in nylon-12

1.0 g powdered $BiI_3$ is dissolved in a melt of 1.0 g nylon-12 at 190° C. under nitrogen in an inert atmosphere glove-box to give a thick clear orange solution. The viscous melt is pressed onto a conductive substrate such as A1 or ITO under nitrogen and allowed to cool to a thin-film of deep red-orange to black material. The results of x-ray induced discharge assessment of the film are shown in Table I.

EXAMPLE 18

$(C_6H_{13}NH_3)_2PbI_4$ (about 67 weight %) in polycarbonate 0.5 g powdered $(C_6H_{13}NH_3)_2PbI_4$ (See Thorn et al. J. Am. Chem. Soc., 1991, 113, 2328) is dissolved in 5 mL THF under nitrogen in an inert atmosphere glove-box. A second solution of 0.25 g polycarbonate in 2.5 mL THF was added to give a pale yellow, clear solution. The solution is coated onto a conductive substrate such as A1 or ITO under nitrogen and allowed to dry to a thin film of golden orange material and gently warmed (60° C.) to remove residual THF solvent. The results of x-ray induced discharge assessment of the film are shown in Table I.

EXAMPLE 19

$(C_6H_{13}NH_3)_2PbI_4$ (about 67 weight %) in PVK 0.5 g powdered $(C_{6H13}NH_3)_2PbI_4$ is dissolved in 5 mL THF under nitrogen in an inert atmosphere glove-box. A second solution of 0.25 g PVK in 2.5 mL THF was added to give a pale yellow, clear solution. The solution is coated onto a conductive substrate such as Al or ITO under nitrogen and allowed to dry to a thin film of golden orange material and gently warmed (60° C.) to remove residual THF solvent. The results of x-ray induced discharge assessment of the film are shown in Table I.

EXAMPLE 20

$(C_6H_{13}NH_3)_2PbI_4$ (about 40 weight %) in polycarbonate 0.2 g powdered $(C_6H_{13}NH_3)_2PbI_4$ is dissolved in 1 mL DMF under nitrogen in an inert atmosphere glove-box. A second solution of 0.3 g polycarbonate in 3 mL DMF was added to give a pale yellow, clear solution. The solution is coated onto a conductive substrate such as Al or ITO under nitrogen and allowed to dry to a thin film of golden orange material and gently warmed (60° C.) to remove residual DMF solvent. The results of x-ray induced discharge assessment of the film are shown in Table I.

EXAMPLE 21

$(C_6H_{13}NH_3)_2PbI_4$ (about 75 weight %) in PMPS 0.75 g powdered $(C_6H_{13}NH_3)_2PbI_4$ and 0.25 g PMPS is dissolved in 2 mL THF under nitrogen in an inert atmosphere glove-box to give a pale yellow, clear solution. The solution is coated onto a conductive substrate such as A1 or ITO under nitrogen and allowed to dry to a thin film of golden orange material and gently warmed (60° C.) to remove residual THF solvent. The results of x-ray induced discharge assessment of the film are shown in Table I.

EXAMPLE 22

$(C_6H_{13}NH_3)_2PbI_4$ (about 75 weight %) in PMMA 0.75 g powdered $(C_6H_{13}NH_3)_2PbI_4$ and 0.25 g PMMA is dissolved in 2 mL THF under nitrogen in an inert atmosphere glove-box to give a pale yellow, clear solution. The solution is coated onto a conductive substrate such as A1 or ITO under nitrogen and allowed to dry to a thin film of golden orange material and gently warmed (60° C.) to remove residual THF solvent. The results of x-ray induced discharge assessment of the film are shown in Table I.

EXAMPLE 23

$(C_6H_{13}NH_3)_2PbI_4$ (about 67 weight %) in PMMA 0.2 g powdered $(C_6H_{13}NH_3)_2PbI_4$ is dissolved in 1 mL THF and a second solution of 0.1 g PMMA dissolved in 1 mL THF is added under nitrogen in an inert atmosphere glove-box to give a pale yellow, clear solution. The solution is coated onto a conductive substrate such as A1 or ITO under nitrogen and allowed to dry to a thin film of golden orange material and gently warmed (60° C.) to remove residual THF solvent. The results of x-ray induced discharge assessment of the film are shown in Table I.

EXAMPLE 24

$(C_6H_{13}NH_3)_2PbI_4$ (about 50 weight %) in PMMA doped with about 25 weight % TPD 0.2 g powdered $(C_6H_{13}NH_3)_2PbI_4$ and 0.1 g TPD is dissolved in 1 mL THF and a second solution of 0.1 g PMMA dissolved in 1 mL THF is added under nitrogen in an inert atmosphere glove-box to give a pale yellow, clear solution. The solution is coated onto a conductive substrate such as A1 or ITO under nitrogen and allowed to dry to a thin film of golden orange material and gently warmed (60° C.) to remove residual THF solvent. The results of x-ray induced discharge assessment of the film are shown in Table I.

EXAMPLE 25

$(C_6H_{13}NH_3)_2PbI_4$ (about 67 weight %) in PMPS 0.2 g powdered $(C_6H_{13}NH_3)_2PbI_4$ is dissolved in 1 mL THF and a second solution of 0.1 g PMPS dissolved in 1 mL THF is added under nitrogen in an inert atmosphere glove-box to give a pale yellow, clear solution. The solution is coated onto a conductive substrate such as Al or ITO under nitrogen and allowed to dry to a thin film of golden orange material and gently warmed (60° C.) to remove residual THF solvent. The results of x-ray induced discharge assessment of the film are shown in Table I.

EXAMPLE 26

$(C_6H_{13}NH_3)_2PbI_4$ (about 50 weight %) in PMPS doped with 25 weight % TPD 0.2 g powdered $(C_6H_{13}NH_3)_2PbI_4$ and 0.1 g TPD is dissolved in 1 mL THF and a second solution of 0.1 g PMPS dissolved in 1 mL THF is added under nitrogen in an inert atmosphere glove-box to give a pale yellow, clear solution. The solution is coated onto a conductive substrate such as A1 or ITO under nitrogen and allowed to dry to a thin film of golden orange material and gently warmed (60° C.) to remove residual THF solvent. The results of x-ray induced discharge assessment of the film are shown in Table I.

EXAMPLE 27

$BiI_3$ (about 50 weight %) in PMMA with 5 weight % dioctylphthalate plasticizer 0.2g powdered $BiI_3$ is dissolved in 6 mL THF containing 0.2 g dissolved PMMA and 0.02 g dioctylphthalate under nitrogen in an inert atmosphere glove-box to give a thick clear orange solution. The solution is coated onto a conductive substrate such as Al or ITO under nitrogen and allowed to dry to a thin-film of black material and gently warmed (60° C.) to remove residual THF solvent. The results of x-ray induced discharge assessment of the film are shown in Table I.

EXAMPLE 28

$C_6H_{13}NH_3)_2PbI_4$ (about 50 weight %) in PMMA with 5 weight % dioctylphthalate plasticizer 0.2 g powdered $(C_6H_{13}NH_3)_2PbI_4$ is dissolved in 6 mL THF containing 0.2 g dissolved PMMA and 0.02 g dioctylphthalate under nitrogen in an inert atmosphere glove-box to give a thick clear yellow solution. The solution is coated onto a conductive substrate such as Al or ITO under nitrogen and allowed to dry to a thin-film of orange material and gently warmed (60° C.) to remove residual THF solvent. The results of x-ray induced discharge assessment of the film are shown in Table I.

EXAMPLE 29

$(C_6H_{13}NH_3)_2PbI_4$ (about 50 weight %) in low molecular weight PMMA 0.2 g powdered $(C_6H_{13}NH_3)_2PbI_4$ is dissolved in 6 mL THF containing 0.2 g dissolved low molecular weight PMMA (from Beckerbauer #60903-156) PMMA under nitrogen in an inert atmosphere glove-box to give a thick clear yellow solution. The solution is coated onto a conductive substrate such as Al or ITO under nitrogen and allowed to dry to a thin-film of orange material and gently warmed (60° C.) to remove residual THF solvent. The results of x-ray induced discharge assessment of the film are shown in Table I.

TABLE I

| X-Ray Induced Discharge[(a)] | | | | |
|---|---|---|---|---|
| Example # | Sample | $t^{1/2}$, sec[(b)] | Voltage, volts | Thickness, microns |
| 1 | 10% $PbI_4$/PVK | 5.5 | 507 | 3.9 |
| 2 | 20% $BiI_3$/PVK | 4.5 | 410 | 3.6 |
| 3 | 10% $BiI_3$/PMPS | 12 | 200 | 2.0 |
| 4 | 50% $PbI_2$/PVK | 1.8 | 257 | 47.5 |
| 5 | 20% BiI3/PVK + BHT | 4.6 | 790 | 15.6 |
| 6 | 20% $Bi_2S_3$/PVK | 4.8 | 160 | 7.0 |
| 7 | 20% $Bi_2Se_3$/PVK | 4.5 | 200 | 7.2 |
| 8 | 50% $BiI_3$/Lexan from THF | 6 | 670 | 17 |
| 9 | 50% $BiI_3$/Lexan from cyclo-pentanone | 6.7 | 730 | 18 |
| 10 | 50% $BiI_3$/poly-styrene | 4 | 315 | 40 |
| 11 | 75% $BiI_3$/poly-styrene | 2 | 146 | 7 |
| 12 | 50% $BiI_3$/poly-stryene + TPD | 6.5 | 170 | 2.8 |
| 13 | 67% $BiI_3$/PMPS | 0.3 | 30 | 91 |
| 14 | 50% $BiI_3$/PCHMS | 1.2 | 60 | 6.7 |
| 15 | 67% $BiI_3$/PMMA | 0.45 | 430 | 113 |
| 16 | 50% $BiI_3$/nylon-11 | 1 (FIG. 2) | 825 | 170 |
| 17 | 50% $BiI_3$/nylon-12 | 1 | 770 | 150 |
| 18 | 67% $PbI_4$/Lexan | 10 | 350 | 16 |
| 19 | 67% $PbI_4$/PVK | 5 | 200 | 7.8 |
| 20 | 40% $PbI_4$/Lexan | 6 | 500 | 12 |
| 21 | 75% $PbI_4$/PMPS | 1 | 110 | 54 |
| 22 | 75% $PbI_4$/PMMA | 1 | 60 | 78 |
| 23 | 67% $PbI_4$/PMMA | 2 | 77 | 154 |
| 24 | $PbI_4$/TPD/PMMA, 50:25:25 | 1.5 | 92 | 156 |
| 25 | 67% $PbI_4$/PMPS | 1.2 | 118 | 76 |
| 26 | $PbI_4$/TPD/PMPS, 50:25:25 | 4.5 | 240 | 79 |
| 27 | 50% $BiI_3$/ PMMA + plasti-cizer | 3.8 | 400 | 62 |
| 28 | 50% $PbI_4$/ PMMA + plasti-cizer | 2 | 480 | 95.5 |
| 29 | 50% $PbI_4$/low M.W. PMMA | 5 | 480 | 105 |

[(a)]Irradiation source: x-ray from a molybdenum target at 30 mA and 40 KV
[(b)]$t_{1/2}$ represents the half-life time of x-ray induced discharge decay curve

What is claimed is:

1. An x-ray radiography apparatus having an x-ray source, an electrostatic image reader and an x-ray sensitive image receptor characterized by:

said image receptor including an x-ray photoconductor composition comprising (1) clusters of at least one semiconductor selected from the group consisting of VB-VIB semiconductors, VB-VIIB semiconductors, IIB-VIB semiconductors, IIB-VB semiconductors, IIIB-VB semiconductors, IIIB-VIB semiconductors, IB-VIB semiconductors, and IVB-VIIB semiconductors, and (2) an organic binder which comprises a polymer component which is essentially non-carrier transporting in the absence of x-rays and optionally a carrier transporting additive component; said cluster component (1) being at least about 0.1 percent by weight of the x-ray photoconductor composition and said organic binder being present in an effective amount to bind the clusters, provided that when the organic binder is essentially non-carrier transporting in the presence of x-rays, the cluster component (1) is at least about 15 percent by volume of the x-ray photoconductor composition.

2. The apparatus of claim 1 wherein the semiconductor is selected from the group consisting of $Bi_2S_3$, $Bi_2Se_3$, $BiI_3$, $BiBr_3$, CdS, CdSe, CdTe, HgS, $Cd_2P_3$, InAs, InP, $In_2S_3$, $In_2Se_3$, $Ag_2S$, $PbI_2$, $PbI_4^{-2}$ and $Pb_2I_7^{-3}$.

3. The apparatus of claim 1 wherein the cluster component is at least 55 percent by weight of the photoconductor composition.

4. The apparatus of claim 1 wherein the clusters range in size from $1\times10^{-3}$ μm to 1 μm.

5. The apparatus of claim 1 wherein the polymer is selected from the group consisting Of N-polyvinylcarbazole, polysilanes, polyanilines, polythiophenes, polyacetylenes, and poly(p-phenylenevinylene).

6. The apparatus of claim 1 wherein the polymer is selected from the group consisting of polymethylmethacrylate, nylons, polycarbonate, polyethylene, polystyrene and copolymers of styrene.

7. An x-ray radiography apparatus, comprising:

an x-ray source;

an x-ray sensitive, photoconductive image receptor;

and an electrostatic image reader;

wherein said image receptor includes an x-ray photoconductor composition comprising (1) clusters of at least one semiconductor selected from the group consisting of VB-VIB semiconductors, VB-VIIB semiconductors, IIB-VIB semiconductors, IIB-VB semiconductors, IIIB-VB semiconductors, IIIB-VIB semiconductors, IB-VIB semiconductors, and IVB-VIIB semiconductors, and (2) an organic binder which comprises a polymer component which is essentially non-carrier transporting in the absence of x-rays and optionally a carrier transporting additive component; wherein said cluster component (1) is at least about 0.1 percent by weight of the x-ray photoconductor composition and said organic binder is present in an effective amount to bind the clusters; wherein said organic binder is essentially non-carrier transporting in the presence of x-rays; and wherein the cluster component (1) is at least about 15 percent by volume of the x-ray photoconductor composition.

8. The apparatus of claim 7 wherein the semiconductor is selected from the group consisting of $Bi_2S_3$, $Bi_2Se_3$, $BiI_3$, $BiBr_3$, CdS, CdSe, CdTe, HgS, $Cd_2P_3$, InAs, InP, $In_2S_3$, $In_2Se_3$, $Ag_2S$, $PbI_2$, $PbI_4^{-2}$ and $Pb_2I_7^{-3}$.

9. The apparatus of claim 7 wherein the cluster component is at least 55 percent by weight of the photoconductor composition.

10. The apparatus of claim 7 wherein the clusters range in size from $1\times10^{-3}$ μm to 1 μm.

11. The apparatus of claim 7 wherein the polymer is selected from the group consisting of polymethylmethacrylate, nylons, polycarbonate, polyethylene, polystyrene and copolymers of styrene.

12. The apparatus of claim 7 wherein the semiconductor is $BiI_3$ and the polymer is a nylon.

13. An x-ray radiography apparatus, comprising:

an x-ray source;

an x-ray sensitive, photoconductive image receptor;

and an electrostatic image reader;

wherein said image receptor includes an x-ray photoconductor composition comprising (1) clusters of at least one semiconductor selected from the group consisting of VB-VIB semiconductors, VB-VIIB semiconductors, IIB-VIB semiconductors, IIB-VB semiconductors, IIIB-VB semiconductors, IIIB-VIB semiconductors, IB-VIB semiconductors, and IVB-VIIB semiconductors, and (2) an organic binder which comprises a polymer component which is essentially non-carrier transporting in the absence of x-rays and optionally a carrier transporting additive component; wherein said cluster component (1) is at least about 0.1 percent by weight of the x-ray photoconductor composition and said organic binder is present in an effective amount to bind the clusters; wherein the cluster component (1) is at least about 15 percent by volume of the x-ray photoconductor composition; and wherein said organic binder is carrier-transporting in the presence of x-rays.

14. The apparatus of claim 13 wherein the semiconductor is selected from the group consisting of $Bi_2S_3$, $Bi_2Se_3$, $BiI_3$, $BiBr_3$, CdS, CdSe, CdTe, HgS, $Cd_2P_3$, InAs, InP, $In_2S_3$, $In_2Se_3$, $Ag_2S$, $PbI_2$, $PbI_4^{-2}$ and $Pb_2I_7^{-3}$.

15. The apparatus of claim 13 wherein the cluster component is at least 55 percent by weight of the photoconductor composition.

16. The apparatus of claim 13 wherein the clusters range in size from $1\times10^{-3}$ μm to 1 μm.

17. The apparatus of claim 13 wherein the polymer is selected from the group consisting of N-polyvinylcarbazole, polysilanes, polyanilines, polythiophenes, polyacetylenes, and poly(p-phenylenevinylene).

* * * * *